United States Patent Office 3,466,885
Patented Sept. 16, 1969

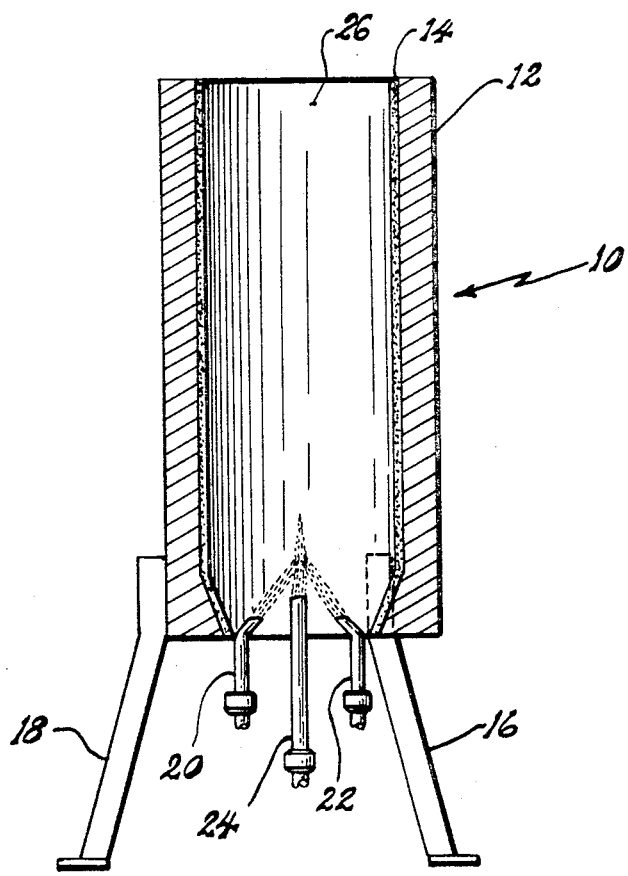

3,466,885
PROCESS FOR THE DISPOSAL OF CONTAMINATED LIQUID FLUORINE
James R. French, Jr., San Gabriel, Calif., assignor to the United States of America as represented by the Secretary of the Air Force
Filed Feb. 26, 1968, Ser. No. 708,057
Int. Cl. F23g 7/04
U.S. Cl. 62—48        5 Claims

ABSTRACT OF THE DISCLOSURE

A method for the disposal of large quantities of a toxic, cryogenic substances such as liquid fluorine by effecting a reaction between the toxic substance and a common, inexpensive gaseous or liquid material, such as water, steam, natural gas or propane gas. The reaction provides heat energy to cause a controlled, low pressure combustion to effect the vaporization and dispersion of the liquid fluorine without generating excessively high temperatures.

BACKGROUND OF THE INVENTION

This invention relates to a process for the disposal of toxic substances. More particularly, this invention concerns itself with a process for the disposal of highly toxic liquid fluorine by causing an exothermic reaction between the liquid fluorine and a fuel substance in order to effect a controlled, low temperature, low pressure combustion with subsequent vaporization of the toxic liquid fluorine.

The disposal of large quantities of cryogenic substances, such as fluorine, presents a serious problem. Liquid fluorine and contaminated fluorine residues are extremely toxic to plant and animal life so that they cannot generally be released into rivers or lakes, nor can they be dumped on land where drainage might reach water sources utilized for human or animal consumption. Merely disposing of the fluorine by vaporizing it into the atmosphere is also quite unsatisfactory. Unless flow rates are very low, the vent system, as it chills, will eject slugs of liquid fluorine which fall back onto the ground causing fire or corrosion problems. If the flow rate is low enough to prevent expulsion of liquid slugs of fluorine, then problems of disposal duration and pressure build up are created. The ejected cloud of gas is very cold and tends to hug the ground and disperse very slowly, thus presenting a safety problem.

Many of the problems encountered while attempting to dispose of toxic fluorine into the atmosphere can be abrogated by utilizing a charcoal scrubber with the fluorine vent system. The charcoal scrubber burns the fluorine producing carbon tetrafluoride. However, the extreme temperatures and copious amounts of charcoal required make this method impractical for the disposal of large amounts of fluorine. Also, once the charcoal is ignited it is difficult to extinguish the fire even by terminating the flow of fluorine.

In an attempt to overcome the problems prevalent in previous methods for disposing of toxic fluorine, it has been found that liquid fluorine can be vaporized and dispersed into the atmosphere in a safe manner by effecting a controlled low pressure combustion of the liquid fluorine at moderate temperatures. The method of this invention accomplishes the low pressure combustion by causing an exothermic reaction between the liquid fluorine and a fuel substance reactive therewith. Among the various common and readily available substances which can be used as the fuel ingredient are water, steam, natural gas and propane gas. By utilizing the highly reactive nature of fluorine, it is possible to add heat to the fluorine through an exothermic reaction between the fluorine and the fuel substance. Thus, there is produced a low pressure combustion at a moderate temperature that is easily controllable and does not necessitate the use of an external heat source. The reaction can be controlled or terminated merely by cutting off or minimizing the flow of either the fluorine or the fuel substance.

SUMMARY OF THE INVENTION

In accordance with the method of this invention, the disposal of highly toxic liquid fluorine is accomplished by a process which produces a low pressure, moderate temperature combustion to cause vaporization of the fluorine with subsequent disposal into the atmosphere in a safe manner. The heat energy necessary to effect combustion is supplied by means of an exothermic reaction between the liquid fluorine and a fuel substance selected from the group consisting essentially of water, steam, natural gas and propane gas.

This method provides a simple, economical, safe and easily controlled means for disposing of large quantities of highly toxic liquid fluorine contaminates without leaving large amounts of residual material or generating excessive temperatures.

Accordingly, the primary object of this invention is to provide a method for disposing of large amounts of highly toxic liquid fluorine.

Another object of this invention is to provide a readily controlled, safe and economical method for disposing of liquid fluorine without generating excessive amounts of heat.

Still another object of this invention is to provide a method for the dispersal of fluorine vapors into the atmosphere in a manner which minimizes the possible precipitation of fluorine vapors as liquid slugs of highly toxic fluorine.

A further object of this invention is to provide a method for the disposal of toxic liquid fluorine by using the reactive nature of fluorine with common, inexpensive gaseous or liquid materials to provide heat energy for the vaporization and dispersion of liquid fluorine into the atmosphere.

These and still further objects and advantages of the present invention will become readily apparent from the description of the invention which follows when taken in conjunction with the accompanying drawing.

BRIEF DESCRIPTION OF THE DRAWING

In the drawing:
The figure represents a cross-sectional view of a combustion chamber suitable for use with the method of this invention.

DESCRIPTION OF THE PREFERRED EMBODIMENT

Pursuant to the above objects of this invention, the present method involves intimately admixing stoichiometric proportions of liquid fluorine and a fuel substance selected from the group consisting essentially of steam, water, natural gas and propane gas within a combustion chamber, thereby effecting an exothermic reaction between the liquid fluorine and the fuel substance to cause a low pressure combustion and vaporization of the liquid fluorine wtih subsequent dispersal thereof into the atmosphere without the utilization of an external source of heat. By operating in accordance with this procedure, it is found that toxic liquid fluorine is not only disposed of but, additionally, disposal is accomplished without the generation of excessively high temperatures and the production of residual material.

Referring to the drawing, there is shown an apparatus suitable for use in the practice of the present invention.

The apparatus comprises a combustion chamber generally designated by reference numeral 10 which consists of a steel pipe 12 of approximately 6.6 inches inside diameter. Positioned within the steel pipe 12 is a graphite liner 14. Two legs, 16 and 18, and a third leg, not shown, are symmetrically positioned in supporting relationship at the bottom of the steel pipe 12. Three inlet tubes, 20, 22 and 24 are provided at the bottom of pipe 12 for the introduction of the liquid fluorine and the fuel ingredient. Inlet tubes 20 and 22 are fuel inlet means and are bent at approximately a 45° angle to facilitate the impingement of the liquid fluorine which enters through tube 24 and the fuel substance. The intimate admixture, in stoichiometric proportions, of the liquid fluorine and the fuel substance effects a low pressure, moderate temperature combustion and vaporization of the liquid fluorine. The fluorine vapors flow up the steel pipe through the open top 26 and are dispersed into the atmosphere.

Steam, at moderate pressure, is preferable as a fuel ingredient since it reacts vigorously with fluorine, reduces the tendency toward unstable combustion because it is a gas, is at a sufficiently moderate pressure to make obtainment and control of flow rates simple, and does not pose an explosion or fire hazard by itself. The flow rate for the reactants can be controlled so as to produce a moderate combustion. Flow rates on the order of one-quarter pound to one-half pound of fluorine material per second have been found preferable for producing moderate temperature combustion at atmospheric pressure.

The other materials for utilization as a fuel ingredient are also suitable but do not produce the optimum result achieved by using steam. Water is most readily available, but is less desirable from a combustion view-point.

The apparatus shown in the drawing may also employ a water cooled jacket, rather than the graphite lining as illustrated.

No description has been given relating to the controls for the fuel and fluorine feeding means and the like which will be employed in the present invention. However, such elements are quite conventional and may be provided at any suitable point on the apparatus as desired.

While there have been described herein what are considered to be preferred embodiments of the invention, it will be obvious to those skilled in the art that modifications and changes may be made without departing from the essence of the invention. It is therefore to be understood that the exemplary embodiments are illustrative and not restrictive of the invention, the scope of which is defined in the appended claims, and that all modifications that come within the means of the claims are intended to be included herein.

I claim:

1. A process for the disposal of large quantities of toxic liquid fluorine comprising the steps of intimately admixing in stoichiometric proportions a liquid fluorine and a fluorine reactive substance selected from the group consisting of water, steam, natural gas and propane gas to effect an exothermic reaction therebetween, thus producing a low pressure, moderate temperature combustion of the liquid fluorine, converting said liquid fluorine to fluorine vapors and permitting said vapor to be dispersed into the atmosphere.

2. A process in accordance with claim 1 wherein said fluorine reactive substance is steam.

3. A process in accordance with claim 1 wherein said fluorine reactive substance is water.

4. A process in accordance with claim 1 wherein said fluorine reactive substance is propane gas.

5. A process in accordance with claim 1 wherein said fluorine reactive substance is natural gas.

References Cited
UNITED STATES PATENTS

| 2,760,342 | 8/1956 | Morrison | 62—48 |
| 3,246,977 | 4/1966 | Hinkle | 23—153 |

LLOYD L. KING, Primary Examiner